(12) United States Patent
Music et al.

(10) Patent No.: US 7,890,821 B2
(45) Date of Patent: Feb. 15, 2011

(54) CHANNEL IMPAIRMENT EMULATOR SYSTEMS AND METHODS

(75) Inventors: Wayne D. Music, Beaverton, OR (US); Thomas Alexander, Mulino, OR (US)

(73) Assignee: Veriwave, Inc., Beaverton, OR (US)

( * ) Notice: Subject to any disclaimer, the term of this patent is extended or adjusted under 35 U.S.C. 154(b) by 747 days.

(21) Appl. No.: 11/867,580

(22) Filed: Oct. 4, 2007

(65) Prior Publication Data
US 2009/0094492 A1 Apr. 9, 2009

(51) Int. Cl.
*G01R 31/28* (2006.01)
*H04B 17/00* (2006.01)

(52) U.S. Cl. ............... 714/715; 714/712; 370/242; 375/224

(58) Field of Classification Search ............ 714/712, 714/715; 370/242; 375/224
See application file for complete search history.

(56) References Cited

U.S. PATENT DOCUMENTS

| | | | |
|---|---|---|---|
| 3,560,985 | A | 2/1971 | Lyon |
| 4,063,250 | A | 12/1977 | Fenwick |
| 4,955,002 | A | 9/1990 | Campbell |
| 5,184,330 | A | 2/1993 | Adams et al. |
| 5,228,055 | A | 7/1993 | Uchida et al. |
| 5,230,076 | A | 7/1993 | Wilkinson |
| 5,541,862 | A * | 7/1996 | Bright et al. ............ 702/122 |
| 5,544,525 | A | 8/1996 | Peterman et al. |
| 5,731,699 | A | 3/1998 | O'Byrne |
| 5,822,380 | A | 10/1998 | Bottomley |
| 5,838,919 | A | 11/1998 | Schwaller et al. |
| 5,881,237 | A | 3/1999 | Schwaller et al. |
| 5,937,165 | A | 8/1999 | Schwaller et al. |
| 6,031,831 | A | 2/2000 | Tan Boon et al. |
| 6,061,725 | A | 5/2000 | Schwaller et al. |
| 6,317,599 | B1 | 11/2001 | Rappaport et al. |
| 6,397,359 | B1 | 5/2002 | Chandra et al. |
| 6,408,335 | B1 | 6/2002 | Schwaller et al. |
| 6,417,805 | B1 | 7/2002 | Hershey et al. |
| 6,442,507 | B1 | 8/2002 | Skidmore et al. |
| 6,449,215 | B1 | 9/2002 | Shell |
| 6,483,814 | B1 | 11/2002 | Hsu et al. |
| 6,499,006 | B1 | 12/2002 | Rappaport et al. |
| 6,724,730 | B1 | 4/2004 | Mlinarsky et al. |
| 6,903,910 | B1 | 6/2005 | Griesing et al. |
| 7,154,959 | B2 * | 12/2006 | Erceg et al. ............ 375/267 |

(Continued)

FOREIGN PATENT DOCUMENTS

ES    EP 1768284 A1 *  3/2007

OTHER PUBLICATIONS

Entin et al., VeriWave Accelerates 802.11n Adoption with World's First Functional and Performance Tester, Jan. 17, 2007, VeriWave, Inc., pp. 1-3.*

Fasulo et al., Westinghouse Calibrated RF Digital Communications Signal Generator and Channel, Emulator, 1993, IEEE, pp. 16-22.*

(Continued)

*Primary Examiner*—John J Tabone, Jr.
(74) *Attorney, Agent, or Firm*—Haynes and Boone, LLP

(57) ABSTRACT

Systems and methods are disclosed herein to provide improved communication system test techniques. For example, in accordance with an embodiment of the present invention, a wireless device test system is disclosed having a channel emulator for multipath and/or MIMO applications to allow the testing of wireless devices (e.g., WLAN devices) in a cabled environment.

33 Claims, 5 Drawing Sheets

U.S. PATENT DOCUMENTS

| | | | | |
|---|---|---|---|---|
| 7,324,588 | B2 * | 1/2008 | Green et al. | 375/224 |
| 7,336,701 | B2 * | 2/2008 | Kearney et al. | 375/224 |
| 7,349,670 | B2 * | 3/2008 | Mlinarsky et al. | 455/67.11 |
| 7,395,060 | B2 * | 7/2008 | Liu | 455/423 |
| 2006/0229018 | A1 * | 10/2006 | Mlinarsky et al. | 455/67.11 |
| 2006/0233111 | A1 * | 10/2006 | Wright | 370/241 |
| 2008/0084951 | A1 * | 4/2008 | Chen et al. | 375/347 |
| 2009/0072838 | A1 * | 3/2009 | Shepherd et al. | 324/537 |

OTHER PUBLICATIONS

Mendelsohn, Finding MIMO: test vendors point the way, Jun. 8, 2006, eeProductCenter, pp. 1-7.*

Arslan, Teaching SDR through a laboratory based course with modern measurement and test instruments, 2007, IEEE, pp. 1-7.*

Schwengler et al., Testing of Fixed Broadband Wireless Systems at 5.8 Ghz, 2005, IEEE, pp. 32-38.*

A.A.M. Saleh and R.A. Valenzuela, "A Statistical Model for Indoor Multipath Propagation," IEEE J. Select. Areas comm., vol. 5, No. 2, 1987, pp. 128-137.

* cited by examiner

CHANNEL IMPAIRMENT EMULATOR SYSTEMS AND METHODS

TECHNICAL FIELD

The present invention relates generally to communication systems and, more particularly, to systems and methods for emulating channel characteristics and testing communication systems.

BACKGROUND

Wireless devices have grown in popularity and are now used in a wide variety of applications. However, wireless devices are generally more difficult to test (e.g., to verify design and measure performance and other parameters) than conventional wired devices. For example, wireless devices often allow mobility, which may create interactions between the physical and the protocol layers that significantly increase the complexity and number of tests necessary to verify a design relative to wired networks. Furthermore, wireless test systems, such as those for testing wireless local area network (WLAN) devices that use IEEE 802.11 standards, may require more complex protocols to address aspects that wired devices usually lack, such as dynamic configuration, the spatial nature of the system, and channel sharing by multiple stations.

There are a number of drawbacks to conventional approaches for testing wireless devices, especially for wireless devices that utilize space diversity or multiple-input multiple-output (MIMO) techniques. For example, one approach employs actual open-air environment testing, which is complex, expensive, requires large dedicated test areas (e.g., a large building), and may be very difficult to reproduce over time at different locations. Alternatively, an actual environment may be approximated using a network of passive devices (e.g., attenuators, phase shifters, and/or power dividers) and/or channel emulation devices with radio frequency up/down conversion, but this approach generally does not scale well, is complex to design and expensive to build, inflexible in terms of the range and variety of environments emulated, and may require a large amount of space and components, especially for the emulation of complex environments. Yet a third approach replaces this network of passive devices that emulates the environment with a combination of RF downconversion, baseband digital signal processing, and RF upconversion; while this approach is more flexible, it is expensive and does not scale well.

Another approach relies on computer simulation of the wireless device and the desired environmental parameters, but this approach is inherently limited and is not capable of performing measurements on the actual wireless device under test. As a result, there is a need for improved wireless device test techniques.

SUMMARY

Systems and methods are disclosed herein to provide improved communications system test techniques. For example, in accordance with an embodiment of the present invention, a communications test system is disclosed that integrates a traffic generator/analyzer with a channel emulator for channel impairment emulation, to allow the testing of communications systems (e.g., WLAN devices or systems) in a cabled environment.

More specifically, in accordance with one embodiment of the present invention, a communications test system includes means for generating at least a first signal for a device under test (DUT); means for conditioning the at least first signal to emulate a channel impairment of the at least first signal, wherein the conditioning of the at least first signal provides a conditioned first signal; means for transmitting the conditioned first signal via at least one wired connection to the DUT; means for receiving via the at least one wired connection at least a second signal from the DUT; and wherein the conditioning means is further adapted to condition the at least second signal to emulate a channel impairment of the at least second signal, wherein the conditioning of the at least second signal provides a conditioned second signal.

In accordance with another embodiment of the present invention, a method of testing a DUT includes generating one or more stimulus signals for transmission to the DUT; conditioning the stimulus signals within a baseband frequency range to emulate channel impairments such as a multipath transmission of the stimulus signals, wherein the conditioning of the input signals provides conditioned stimulus signals; and transmitting the conditioned stimulus signals via wired connections to the DUT.

In accordance with another embodiment of the present invention, a method of testing a DUT includes receiving via wired connections one or more response signals from the DUT; conditioning the response signals within a baseband frequency range to emulate channel impairments such as multipath transmission of the response signals, wherein the conditioning of the response signals provides conditioned response signals; and analyzing the response signals.

In accordance with another embodiment of the present invention, a communication test system is disclosed that includes a packet traffic generator/analyzer adapted to generate a first set of digital packet signals (i.e., stimuli) to a wireless DUT, and analyze digital packet signals (i.e., responses) from the wireless DUT; a baseband unit adapted to convert the first set of digital packet signals into a first set of digital baseband signals, and further adapted to convert a second set of digital baseband signals into a second set of digital packet signals; a channel emulator adapted to condition the first and second set of baseband signals to emulate a wireless multipath environment between the communications test system and the wireless DUT; and a converter circuit adapted to convert the first and second set of conditioned baseband signals into a first and second set of radio frequency (RF) signals that are sent to and received from the wireless DUT, respectively, using an arrangement of cables.

In accordance with another embodiment of the present invention, a communications test system includes a signal generation and analysis circuit adapted to generate a first set of signals for transmission to a device under test (DUT), and further adapted to process a second set of signals from the DUT; a channel emulator adapted to condition the first and second set of signals to emulate channel impairments between the communications test system and the DUT; and a converter circuit adapted to transmit the first set of signals generated by the signal generation and analysis circuit and conditioned by the channel emulator to the DUT, and wherein the converter circuit is further adapted to receive the second set of signals from the DUT prior to being conditioned by the channel emulator and processed by the signal generation and analysis circuit.

In accordance with another embodiment of the present invention, a test system includes means for generating at least a first signal for transmission to a wireless device; means for conditioning the at least first signal in a baseband frequency range to emulate channel impairments between the test system and the wireless device to provide a conditioned first signal; means for transmitting in a radio frequency range the conditioned first signal via a wired connection to the wireless device; means for receiving in a radio frequency range via the wired connection at least a second signal from the wireless device and converting the at least second signal to a baseband frequency range; wherein the conditioning means is further adapted to condition the at least second signal in the baseband frequency range to emulate channel impairments between the wireless device and the test system to provide a conditioned second signal; and means for processing the conditioned second signal.

In accordance with another embodiment of the present invention, a method of testing a wireless device by a test system includes generating one or more input signals for transmission to the wireless device; conditioning the input signals within a baseband frequency range to emulate channel impairments between the test system and the wireless device to provide conditioned input signals; transmitting in a radio frequency range the conditioned input signals via a wired connection to the wireless device; receiving in a radio frequency range via the wired connection one or more output signals from the wireless device and converting the output signals to a baseband frequency range; conditioning the output signals within the baseband frequency range to emulate channel impairments between the wireless device and the test system to provide conditioned output signals; and processing the conditioned output signals.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
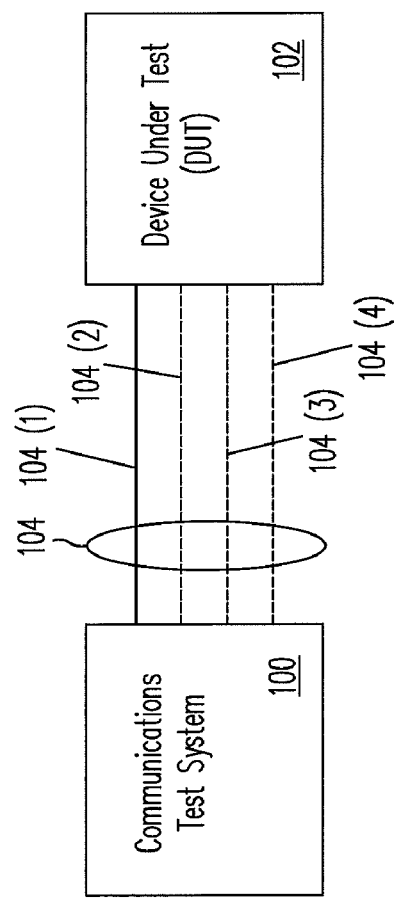
FIG. 1 shows a block diagram illustrating an exemplary arrangement of a communications test system and a DUT in accordance with an embodiment of the present invention.

FIG. 1 shows a block diagram illustrating an exemplary communications test system 100 in accordance with an embodiment of the present invention. Communications test system 100 connects to wired or wireless DUT 102 using one or more cables 104 (which are separately referenced for this example as 104(1) through 104(4)). Test system 100 may transmit test stimuli to DUT 102 via cables 104, and may further receive test responses from DUT 102 via cables 104. DUT 102 may contain multiple RF or wired interfaces, in which case each interface may be driven with a separate test stimulus transmitted from test system 100, and each interface may further provide separate test responses that are received by test system 100. Test system 100 may be connected via cables 104 to some, all, or one of the interfaces physically present on DUT 102. Further, in the case where DUT 102 may have multiple interfaces connected to test system 100, the test stimuli and/or responses exchanged between test system 100 and DUT 102 may be different across the interfaces.

Figure 2:
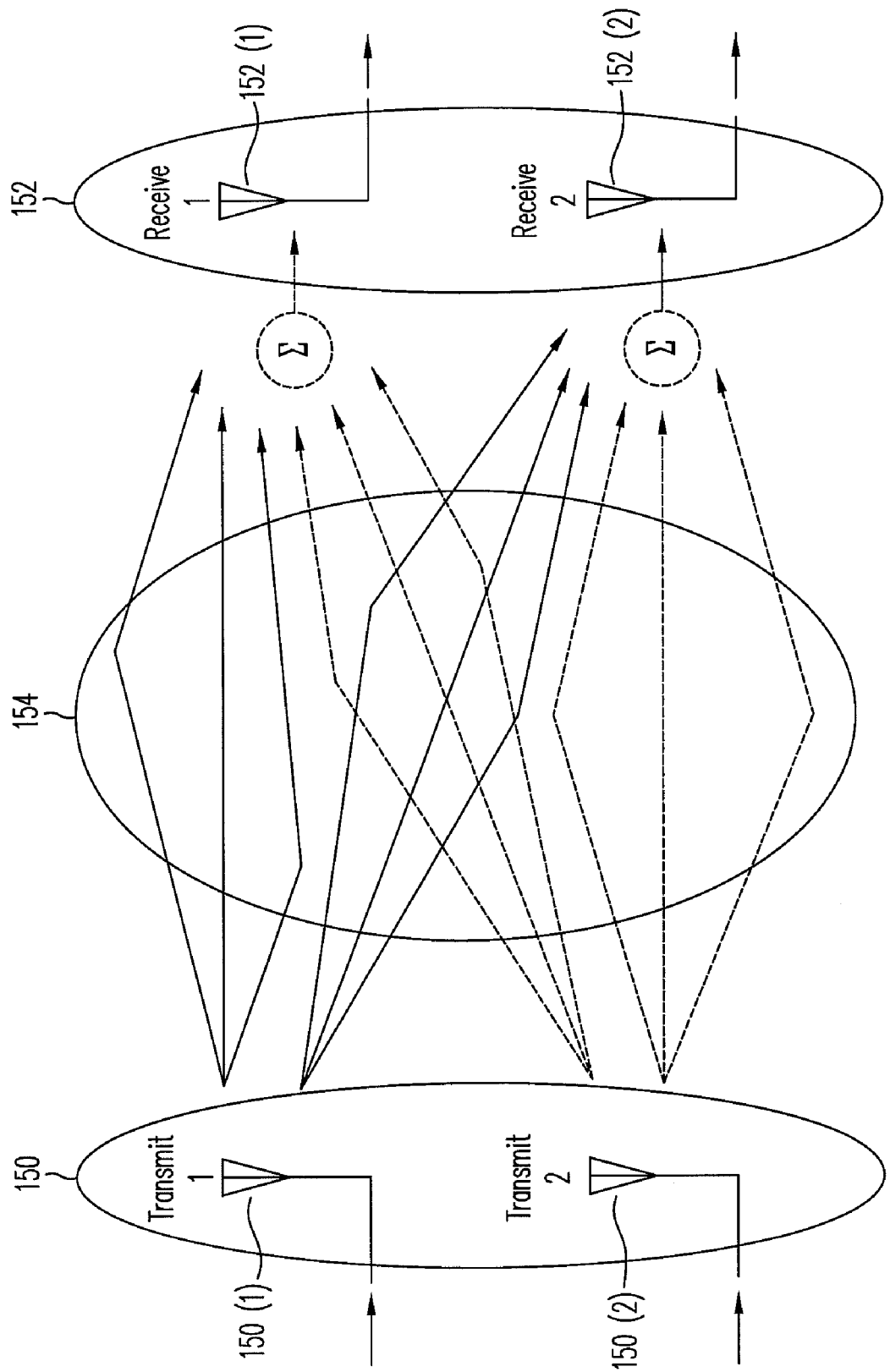
FIG. 2 shows a block diagram illustrating an exemplary wireless communications system with multipath impairments being induced in the channel in accordance with an embodiment of the present invention.

FIG. 2 depicts a block diagram illustrating an exemplary wireless communications system experiencing multipath impairments in the communication channel. The wireless communications system includes one or more wireless devices 150 and 152 and may represent any type of wireless communication system, including for example a single-input single-output (SISO) or a MIMO system.

As an example for a MIMO system, wireless devices 150(1) and 150(2) (labeled Transmit 1 and Transmit 2, respectively) may represent transmitting portions of a single wireless device 150 that is currently transmitting to wireless devices 152(1) and 152(2) (labeled Receive 1 and Receive 2, respectively), which may represent receiving portions of a single wireless device 152. Wireless devices 150 and 152 may each represent an access point, a repeater, a bridge, a computer, a wireless telephone, or other types of wireless devices. For this example, rays 154 are shown in FIG. 2 to represent exemplary wireless transmission paths within the propagation environment that may exist between wireless device 150 and wireless device 152. Specifically, rays 154 may include line-of-sight (LOS) and non-line-of-sight (NLOS) wireless transmission paths, which may be viewed as multipaths between wireless device 150 and wireless device 152. Thus for this example, the wireless communications system may represent a two by two MIMO WLAN channel.

In general, in accordance with an embodiment of the present invention, multipath behavior should be accurately emulated for test purposes to properly measure its affect on a wireless device (e.g., a transceiver) under test. An emulated channel may provide certain advantages, for example with the testing performed under a controlled environment and without the need to deal with the environment and physical logistics. Furthermore, wireless devices employing MIMO technology (e.g., wireless radios such as a wireless access point) require multipath to achieve maximum performance, but conventional test systems (e.g., a conventional traffic generator and performance analyzer (TGA)) connected directly via a wired connection to the wireless device would not be able to adequately test the multipath parameters.

In contrast, in accordance with one or more embodiments of the present invention, a test system is disclosed that includes a channel emulator that emulates a real-world environment by taking baseband data streams prior to each radio frequency (RF) channel (e.g., MIMO RF channel) and reconditioning the signals. The reconditioned signals may be generated, for example, for the emulation of an indoor (or outdoor) channel for the desired MIMO configuration (e.g., a four by four MIMO configuration).

Figure 3:
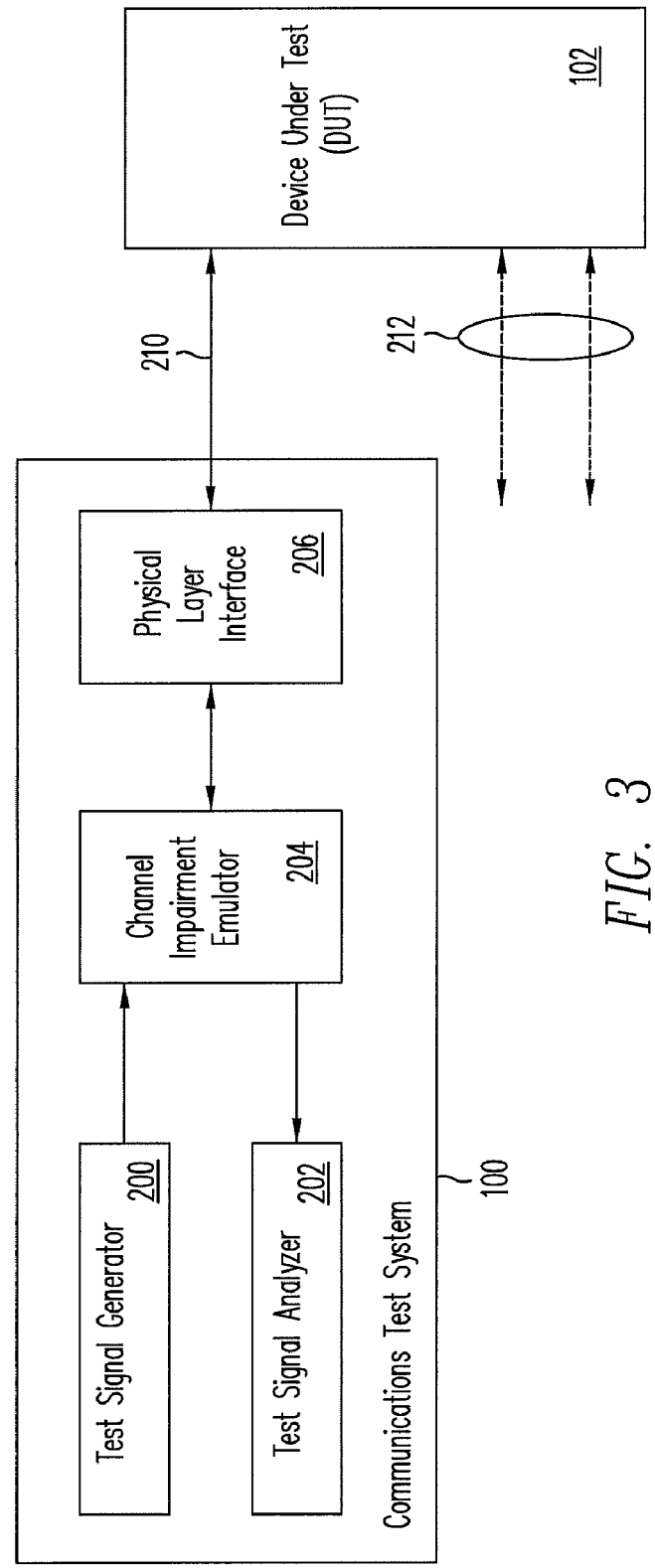
FIG. 3 shows a block diagram illustrating an exemplary system for testing communication systems in accordance with an embodiment of the present invention.

For example, FIG. 3 shows a block diagram illustrating an exemplary setup for testing communication systems in accordance with an embodiment of the present invention. The setup includes a communications test system 100 and wireless DUT 102 interconnected by signal cables 210. Communications test system 100 may include a test signal generator 200 (e.g., a packet traffic generator), a test signal analyzer 202 (e.g., a packet traffic analyzer or a packet traffic recorder), a channel impairment emulator 204 (e.g., a MIMO wireless channel emulator, or an optical fiber emulator) and a physical layer interface 206 (e.g., a wireless RF up/down converter, or an optical fiber transceiver).

Communications test system 100 may, for example, represent an IEEE 802.11 WLAN communication test system for performing traffic generation and performance analysis for DUT 102, which may correspondingly be a WLAN DUT. In such a situation, communications test system 100 may perform most of its functions at baseband frequencies, possibly in a purely digital form utilizing digital signal processing logic. Channel impairment emulator 204 may then be implemented at baseband frequencies as well, and may further be implemented using digital techniques also. Physical layer interface 206 may then convert the processed signals from baseband frequencies to RF signals that may be needed by DUT 102. These RF signals may be transported by signal cables 210 (e.g., RF cables or waveguides) to DUT 102.

Note that DUT 102 may contain additional interfaces that may be connected to additional elements of communication test system 100 (or other devices not represented in FIG. 3) via additional cables 212. It is understood that the techniques described herein may be applied to these additional interfaces as well, if desired.

Figure 4:
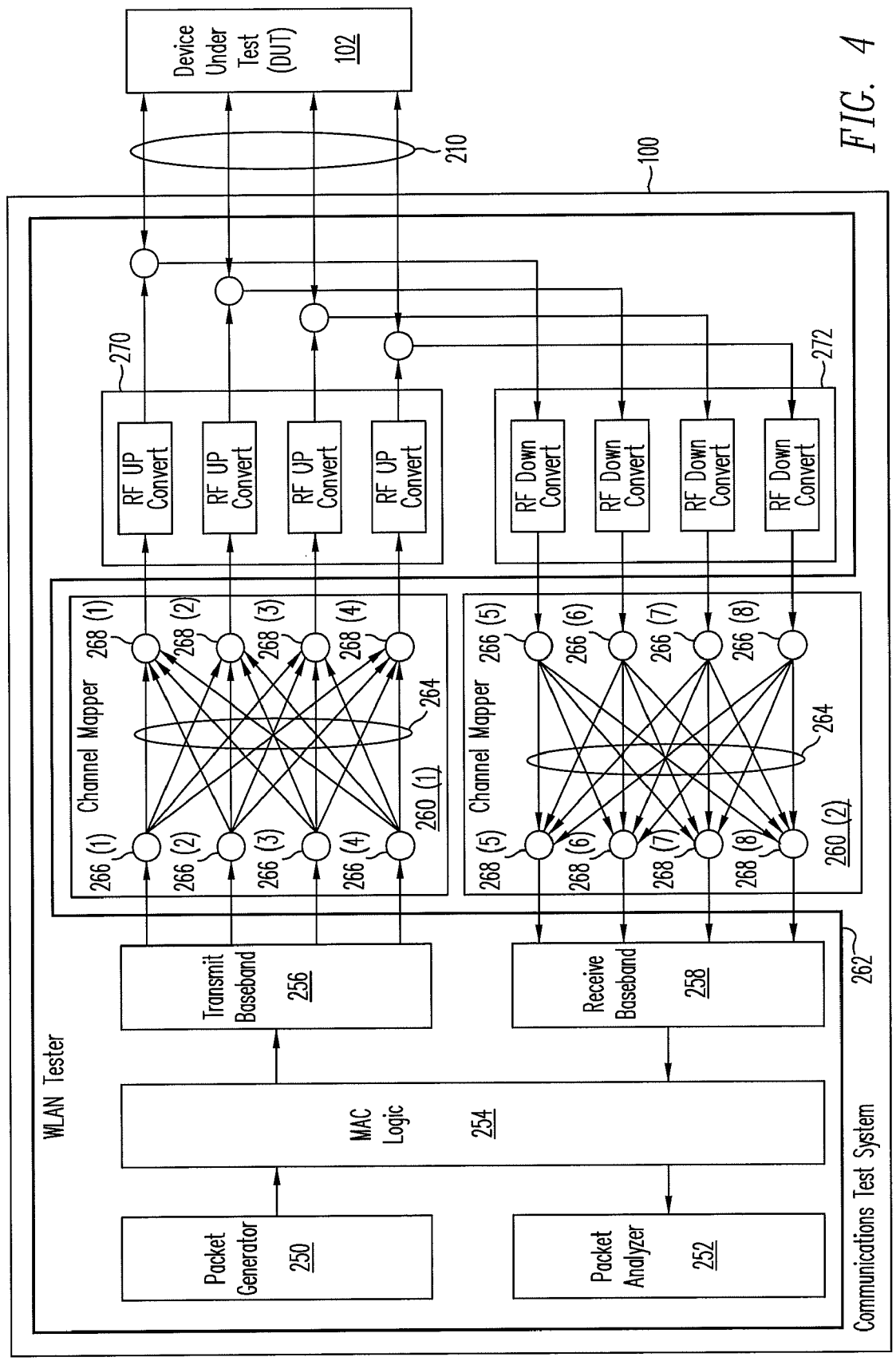
FIG. 4 shows a block diagram illustrating an exemplary wireless communications test system in accordance with another embodiment of the present invention.

FIG. 4 depicts a more detailed exemplary block diagram of a wireless LAN MIMO communications test system 100 interconnected by one or more cables 210 to DUT 102. The diagram depicts a four-by-four (4×4) MIMO system (i.e., containing four separate RF paths per wireless interface) but it is understood that the diagram will pertain equally to any N×M MIMO order where N and M are independent positive non-zero integers.

Test system 100 may emulate a wireless environment with the desired test conditions, in addition to generating and analyzing LAN test data streams that may be required by DUT 102. For example in accordance with an embodiment of the present invention, channel mappers 260 (e.g., digital signal processor based channel emulators) are provided within test system 100 to create emulated multipath at baseband to enable full MIMO operation while directly connected via wired connections 210 to DUT 102. DUT 102 may represent, for example, wireless device 150 or wireless device 152 of FIG. 2.

As shown in FIG. 4, communications test system 100 may comprise a logical sub-part referred to as WLAN tester 262, and another logical sub-part referred to as channel mapper 260. Further, channel mapper 260 may be divided into two subunits referenced as 260(1) and 260(2); in this exemplary figure, channel mapper subunit 260(1) may perform transmit-direction processing, while channel mapper subunit 260(2) may perform receive-direction processing. The two subunits 260(1) and 260(2) may be identical, as depicted in the figure, but it will be understood that they may also be different (e.g., to implement dissimilar processing in the receive and transmit directions).

WLAN tester 262 may be represented generally in a functional manner by packet generator 250, packet analyzer 252, medium access control (MAC) logic 254, transmit baseband process 256, receive baseband process 258, RF upconverters 270, and RF downconverters 272. Packet generator 250 may generate WLAN packet data signals that are to be used to stimulate DUT 102, while packet analyzer 252 may accept and process WLAN packet data response signals from DUT 102. MAC logic 254 may implement some desired functions of the 802.11 WLAN MAC protocol. Transmit baseband 256 may perform a modulation process (e.g., the 802.11 modulation process) on the digital signals generated by MAC logic 254 to create digital baseband signals; likewise, receive baseband 258 may perform a demodulation process (e.g., the 802.11 demodulation process) on the digital baseband signals to generate digital signals for MAC logic 254. Converters 270 and 272 may provide appropriate up and down analog-to-digital, digital-to-analog, frequency conversion and RF signal transmission/reception functions for transmitting signals to and receiving signals from wireless device 102 via wired connections (cables) 210.

Transmit and receive baseband processes 256 and 258, respectively, are shown separately in FIG. 4 for clarity; however, these can be combined into a single unit if desired as would be understood by a person skilled in the art. It is further understood that the functions of packet generator 250, packet analyzer 252, and MAC logic 254 are represented and described herein for clarity and ease of understanding, but are not to be taken in a limiting sense with respect to the scope of the present invention.

Channel mappers 260 may be implemented, in accordance with an embodiment of the present invention, with an array of finite impulse response (FIR) filters to generate the response of some or all of the transmission paths 154 shown in FIG. 2. For example, channel mappers 260 may include a number of simulated transmitting antennas or signal sources 266 and simulated receiving antennas or signal summers 268, and the FIR filters may be employed to condition paths 264 between these simulated transmitting and receiving antennas. Therefore, as illustrated in FIG. 4 for this exemplary implementation, a receiving antenna 268(1) in channel mapper 260(1) receives four of the set of transmission paths 264, comprising one transmission path from each transmitting antenna 266(1) through 266(4).

Each transmission path in the set of paths 264 may be represented by a single complex coefficient (e.g., amplitude and phase information) delayed by a specific time value. When representing multipath propagation comprising some combination of LOS and/or NLOS paths (e.g., as shown and discussed in reference to FIG. 2), multiple FIR taps may be required for each transmission path in the set of paths 264. Each FIR tap may have a defined complex coefficient to account for multipath, which may be emulated for example by a linear transversal filter.

Further, the different channel responses obtained between different combinations of transmit and receive antennas (as depicted in FIGS. 2 and 4) may be realized by the different complex coefficients and delay values of the different emulated transmission paths 264 within channel mapper 260. For example, the emulated transmission paths 264 may in fact be arranged to represent the entire set of actual transmission paths 154 depicted in FIG. 2. It will be obvious to those skilled in the art that any combination of multipath, equivalent to any realizable propagation environment, may be represented by a sufficiently large FIR filter arrangement in the manner described.

Thus, test system 100 with embedded channel mappers 260 may provide certain advantages over conventional test system approaches. For example, channel mappers 260 (e.g., embedded MIMO channel emulators) may be used to enhance quality assurance testing for wireless transceivers and networks, provide various MIMO configurations and environmental scenarios, improve error debugging, provide controlled testing in a screen room, and/or provide more accurate performance capability comparisons among competing products.

For example, test system 100 may provide additional functions to further improve the testing of WLAN DUT 102. It may provide a graphical user interface (GUI) based configuration capability for ease of programmability by a user. It may support certain desired predefined wireless propagation channel models (e.g., the channel models recommended by the IEEE 802.11n Working Group). It may also test bi-directionally for uplink and downlink paths. Further, test system 100 may be designed to provide any desired channel configuration modeling (e.g., up to a 4×4 MIMO or larger configurations), depending upon the application and desired capabilities.

The processing and control functions of test system 100 may be provided as a combination of hardware, software, and/or other types of programmable devices. For example, baseband processes 256 and 258 and/or channel mappers 260 may be implemented in software executed by a processor and/or implemented in one or more programmable logic devices (e.g., a field programmable gate array (FPGA)). Furthermore, by implementing at least portions of channel mappers 260 within digital signal processor (DSP) software or within a field programmable gate array (FPGA), channel mappers 260 may operate at high speed and yet remain programmable (e.g., upgradeable to implement the latest channel or emulation models).

Figure 5:
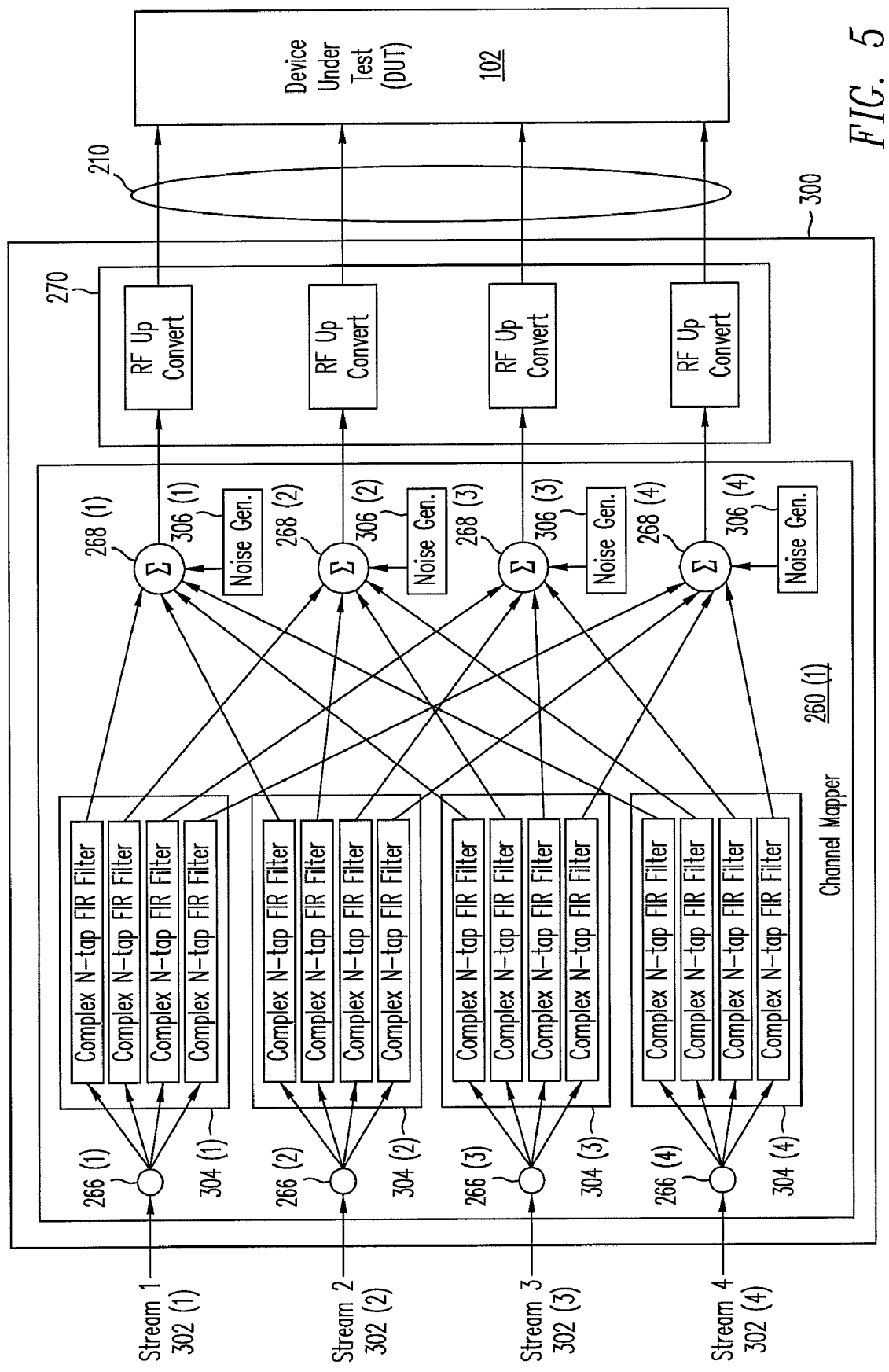
FIG. 5 shows a block diagram illustrating an exemplary implementation for a portion of the system of FIG. 4 in accordance with an embodiment of the present invention.

The block diagram in FIG. 5 illustrates an exemplary architecture for a portion of test system 100 of FIG. 4 in accordance with an embodiment of the present invention. More specifically, FIG. 5 may be viewed as illustrating an exemplary architecture for channel mapper 260(1) of FIG. 4 for an exemplary 4×4 MIMO scenario, with the techniques disclosed also applicable to channel mapper 260(2) as would be understood by one skilled in the art. However, it should be also be understood that the techniques disclosed herein are not limiting and may be applied to different types of test systems (e.g., a wired copper or optical test system), different test scenarios, and different MIMO configurations (e.g., larger or smaller than 4×4).

Specifically, a system 300 receives signals 302(1) through 302(4), which for this example may be viewed as representing signals from baseband process 256 (it should be understood, however, that these signals may be obtained equally well from RF downconverters 272, for the case of channel mapper 260 (2)). For example, signal 302(1), labeled stream 1, is received by corresponding filters 304(1) (e.g., complex N-tap FIR filters), which condition signals 302(1) at baseband to emulate the desired wireless environment (e.g., LOS and/or NLOS multipath). The resulting conditioned signals are summed by summer 268(1), and optional noise from noise generator 306(1) may further be added to the conditioned signals. Finally, the conditioned signals may then be transmitted by converter 270 (i.e., applying appropriate frequency conversion and modulation per the desired wireless standard or specifications) via wired connection 210 to wireless DUT 102.

In a similar fashion, signals 302(2) through 302(4) may also be conditioned by corresponding filters 304(2) through 304(4) at baseband and summed by summers 268(2) through 268(4), with noise added from noise generators 306(2) through 306(4) prior to transmission to wireless DUT 102 via wired connections 210.

Noise generator 306(1) may for example be realized using a pseudorandom number generator (PRNG) or a linear feedback shift register (LFSR), which may further be filtered and processed to provide any desired noise characteristics (e.g., white Gaussian noise, pink noise, etc.).

As an example, filters 304(1) through 304(4) may also be implemented as complex N-tap FIR filters (e.g., complex transversal filters) as shown, and the various taps may have different complex weights (coefficients) applied. It will be apparent that filter coefficients for filters 304 and noise parameters for noise generators 306 may be determined to provide any desired signal conditioning and channel emulation conditions. For example, the filter coefficients may be generated based upon the propagation models described in the IEEE 802.11-03/940r4 document to emulate a MIMO channel (e.g., up to a 4×4 MIMO configuration). Depending on the desired test scenario, the filter coefficients and noise parameters may be statically set for a particular test in time, or may be time varying (e.g., to model Doppler shift, channel variations due to fluorescent lighting, and various types of noise or interference sources). Furthermore, the filter coefficients may be changed for any desired channel configuration that may be associated with a particular test objective.

Furthermore, the filter coefficients may be generated based upon other channel models. For example, filters 304 (e.g., each complex N-tap FIR or transversal filter) may be implemented with eighteen taps (i.e., N=18) for a MIMO channel emulator based upon the IEEE 802.11-03/940r4 document. However this is not limiting and any number of taps may be implemented based upon other types of channel models, as would be understood by one skilled in the art.

As an example, the IEEE 802.11-03/940r4 document may be used to create channel models for six different cases—A, B, C, D, E, and F (e.g., IEEE 802.11n channel models). From these models (e.g., based upon the cluster model set forth in the document by A. A. M. Saleh and R. A. Valenzuela, "A Statistical Model for Indoor Multipath Propagation," *IEEE J. Select. Areas Comm.*, vol. 5, No. 2, 1987, pp. 128-137), the complex N-tap FIR filter coefficients may be generated based upon various parameters input by a user of communications test system 100.

Figure 6:
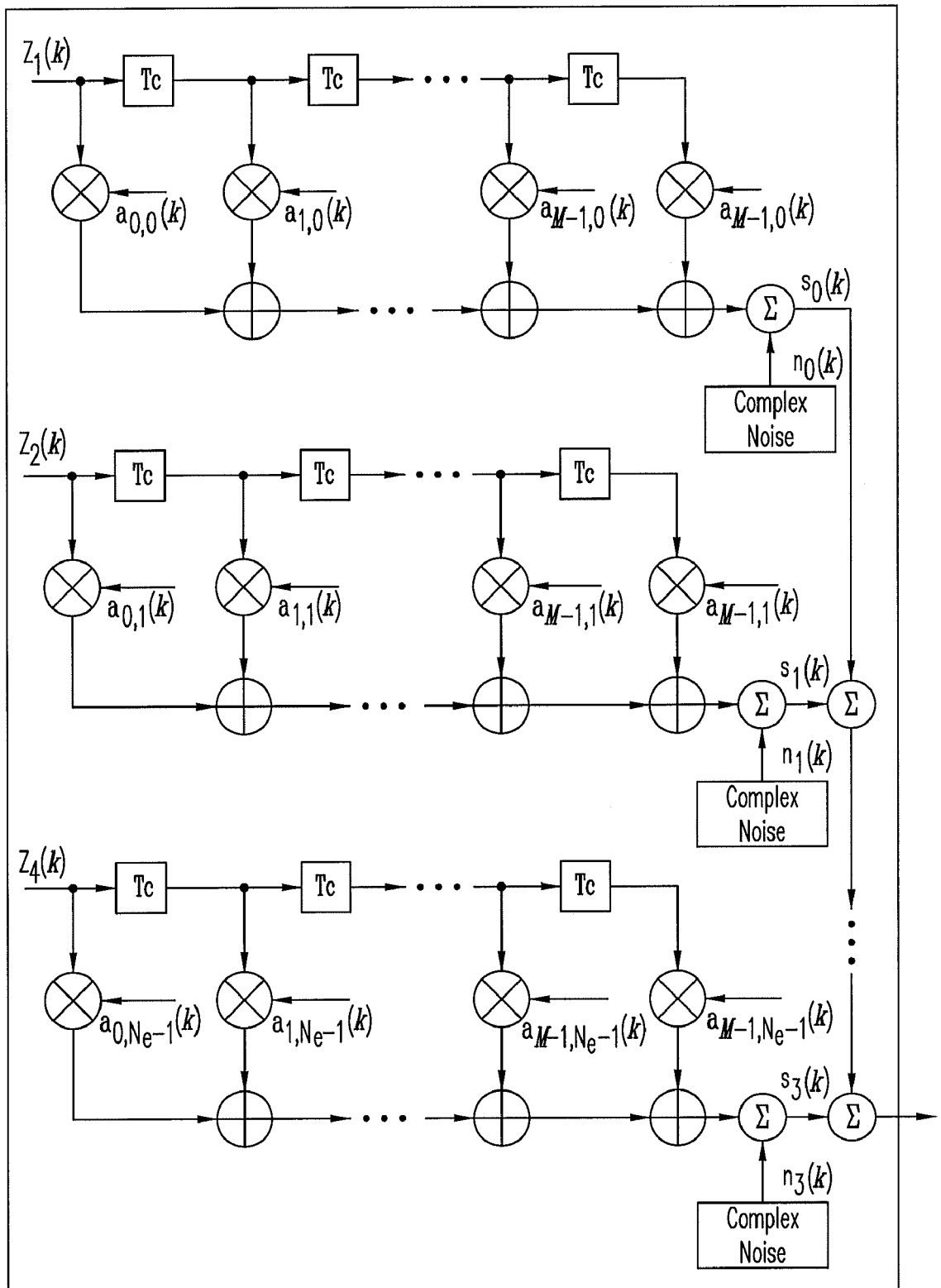
FIG. 6 shows a block diagram illustrating an exemplary implementation for a portion of the system of FIG. 5 in accordance with an embodiment of the present invention.

As an example, FIG. 6 shows a block diagram of a channel emulator 400, which represents an exemplary implementation for filters 304 (e.g., filter 304(1)) of FIG. 5 in accordance with an embodiment of the present invention. For example, channel emulator 400 (e.g., a vector channel emulator) illustrates in more detail the N-tap structure for the exemplary four complex N-tap FIR filters of filter 304(1).

Input signals $Z_1(k)$ through $Z_4(k)$, which may represent signals 302(1) through 302(4) (i.e., streams 1 through 4), are provided to the corresponding four FIR filters as the transmission streams that may result from spatial multiplexing. The FIR coefficients are labeled as $a_{i,j}(k)$, where "i"=0, . . . , M-1 and "j"=0, . . . , $N_e$-1 (for the purposes of this example M represents the number of taps for each FIR filter and $N_e$ represents the number of spatial streams). Suitably shaped complex noise derived from a noise generator, e.g. using a PRNG or an LFSR, may further be added to each FIR filter output, producing four output signals $s_0(k)$ through $s_3(k)$. These output signals are summed together as shown and represent what a receiving antenna would observe (e.g., an actual receiving antenna of wireless device 102). For the other three output signals (e.g., from filters 304(2) through 304(4)) of a 4×4 MIMO configuration, the FIR taps may be different for each FIR filter due to the different multipaths seen by the other three antennas of the DUT, and the complex noise generators may also produce different levels and characteristics of noise due to the different noise levels seen by the other three antennas.

The number of FIR taps may vary depending upon the channel model employed. For example, the IEEE 802.11n models use 1, 9, 14, and 18 FIR taps, depending upon which case model A-F is implemented. In general, the amount of memory required to contain these FIR taps may not be significant. For example for the largest IEEE 802.11n model (i.e., 4×4 configuration of Model F), there will be eighteen complex weights per FIR filter, resulting in 576 real words of 16 to 22 bits in width, which represents a relatively small amount of storage. However, there may be a significant amount of complex arithmetic involved, with for example 1,152 multipliers and 864 adders. Various methods of reducing the implementation complexity by consolidating taps, pipelining the FIR filters, and employing space-time tradeoffs will be apparent to those skilled in the art.

As an example, Table 1 provides exemplary specifications for communications test system 100—and specifically channel mappers 260—in accordance with an embodiment of the present invention. However, the exemplary specifications should not be considered limiting and may vary as desired depending upon the application, design, and test requirements. In general, test system 100 may allow the testing of network equipment based, for example, on IEEE 802.11 standards and provide the ability to generate and analyze test traffic flows for various application, environmental, and channel conditions. Test system 100 may include a wireless MIMO channel emulator, which may be used to emulate a signal channel or a MIMO channel for any desired configuration (e.g., for a 1 by 1, 2 by 1, 1 by 2, 2 by 2, or larger) depending upon the desired application. As discussed, the MIMO channel emulator may have filter coefficients that are pre-computed to represent any desired channel configuration test.

TABLE 1

Channel Emulation

| | |
|---|---|
| Maximum number of channels | 32 |
| Maximum number of taps per channel | 18 |
| Pre-configured models | (1) IEEE 802.11n Channel Models (IEEE 802.11-03/940r4 Models A, B, C, D, E, and F) (2) Bypass mode (unity matrix) |
| Transmit/Receive antenna spacing setting | ½, 1, 4 λ |
| Maximum delay spread | 1.2 μsec |
| Minimum path insertion delay | <1 μsec |
| Maximum Doppler shift | ~200 Hz |
| RF Frequency | |
| Input frequency | 2400-2500 MHz 4900-5845 MHz |
| Center frequency | Band center (e.g., for IEEE 802.11a/b/g/h/j/n channels) |
| Bandwidth | 40 MHz |
| Signal Levels | |
| RF input level maximum | +20 dBm |
| RF input level minimum | −10 dBm |
| RF output power average | −45 dBm |
| RF output power peak | −20 dBm |
| RF attenuator range | 60 dB |
| Resolution | 1 dB |
| Accuracy | ±1 dB |
| Dynamic Range | |
| Number of input bits | 16 |
| Number of output bits | 22 |
| Error Vector Magnitude (EVM) | <−35 dB |
| Bi-directional (Reciprocal) Channel Balance | |
| Phase error between channels | 8° |
| Amplitude error between channels | 1 dB |

The techniques disclosed herein may provide certain benefits over conventional approaches to communications testing. For example, test system 100 provides for an emulation of a real wireless, optical, or twisted pair channel, with the emulator being implemented in purely digital logic by channel mappers 260 as an integral part of a traffic generator and analyzer. Thus, the emulator may provide an integrated approach that eliminates the need for a stand-alone emulator module, and allows greatly simplified testing of, for example, wireless LAN devices that utilize space diversity or MIMO techniques, and in a cabled or fully-shielded environment. The implementation of the emulator in a purely baseband processing form with no additional up/down conversion stages or baseband filtering stages may substantially reduce cost as well as noise, distortion and nonlinearity artifacts that may be associated with stand-alone emulator modules or systems. Additionally, the techniques disclosed herein may provide a fully configurable approach to channel emulation for communications device testing, and may enable the properties of the emulated channel to be modified in order to perform different types of tests.

The techniques disclosed herein may also simplify the repeatability, in space and time, of measurements performed on a system comprising a large number of wireless LAN devices utilizing space diversity or MIMO techniques. In contrast, conventional approaches may only properly test a wireless device in an actual open-air environment, where the measurement results may be difficult to duplicate; or may use analog channel emulation devices that may add unknown amounts of noise and distortion to the system; or may require external digital channel emulation devices that may be prohibitively expensive.

Furthermore, the techniques disclosed herein allow the testing of wireless LAN devices utilizing space diversity or MIMO techniques in emulated environments that represent extrema of actual environments found in the real world (e.g., an emulated environment containing many more scatterers of different types than would normally occur in practice) to verify the worst-case performance of a DUT such as a wireless LAN device.

The techniques disclosed herein may also facilitate the simulation of multiple clients located at multiple different points within a given environment, but using only a single piece of hardware (e.g., a single test system line card). Multiple client simulation may be accomplished, for example, by selecting and configuring appropriate parameters into the hardware on a per-client or a per-packet basis, i.e., context switching the emulation parameters programmed into channel mapper 260 as packets from different simulated clients are transmitted, to ensure that each packet is processed with the appropriate emulation parameters corresponding to the propagation environment existing between that client and the DUT. It will be apparent to those skilled in the art that this technique is also easily applied to support the simulation of multiple access points communicating with a wireless DUT, in the case that DUT 102 is a wireless client.

For example, in accordance with an embodiment of the present invention, a space-diversity/MIMO channel emulator may be incorporated with low overhead and cost as part of every line card or test interface within communications test system 100, which is then enabled to emulate multiple locations within a given scattering environment. The line card may further provide multi-client simulation capability to enable the low-cost, low-complexity simulation of mobile clients at different locations in a variety of different real-world, open-air environments. Consequently, test system 100 may provide a scalable IEEE 802.11n wireless LAN test system that is capable of measuring the actual environment-dependent performance of IEEE 802.11n access points and switches. Furthermore, test system 100 may allow the low-cost simulation of spatial motion of multiple clients within an open-air environment, by altering the environment emulation parameters on a time-varying basis, without being forced to set up actual clients in a real open-air environment and physically move them about.

In general, systems and methods are disclosed herein to provide improved communication test techniques. For example, in accordance with an embodiment of the present invention, a test system is disclosed having an emulator for the physical channel characteristics that may exist as a result of copper, optical fiber, or electromagnetic propagation in an actual network. In accordance with another embodiment of the present invention, the test system may be adapted to emulate multipath and noise in MIMO wireless applications, to allow the testing of wireless LAN devices in a cabled environment without losing the benefits of testing in an open-air environment. Furthermore, the test system may support scalable testing of wireless LAN devices utilizing space-diversity or MIMO techniques; may provide measurement repeatability for tests performed on MIMO wireless LAN devices without replicating the actual environment; and/or may allow testing with worst-case environmental parameters that may not be achievable in the real world. The test system may also simulate multiple clients using a single piece of hardware while still maintaining different environmental parameters on a per-client basis, and may also simulate the motion of multiple clients within an open-air environment without the use of actual clients that are being physically moved.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A communications test system comprising:
   a test traffic generator circuit adapted to generate a first sequence of discrete digital test signals according to a medium access control protocol;
   a test traffic analyzer circuit adapted to process a second sequence of discrete digital test signals according to said medium access control protocol;
   a digital baseband signal generation circuit adapted to convert said first sequence of discrete digital test signals into a first set of digital baseband signals for transmission to a device under test (DUT);
   a digital baseband signal reception circuit adapted to convert a second set of digital baseband signals received from said DUT into said second sequence of discrete digital test signals;
   a first digital channel emulator circuit adapted to accept said first set of digital baseband signals, and is further adapted to condition said first set of digital baseband signals in a digital domain prior to analog conversion,
   a transmit analog converter circuit adapted to accept and convert said first set of digital baseband signals conditioned by said first digital channel emulator circuit to transmitted analog signals, and transmit said transmitted analog signals to said DUT; and
   a receive analog converter circuit adapted to receive a set of received analog signals from said DUT, convert said set of received analog signals to said second set of digital baseband signals, and pass said second set of digital baseband signals to said digital baseband signal reception circuit;
   wherein said first digital channel emulator circuit is adapted to introduce effects of transmission channel impairments into said first set of digital baseband signals, and further adapted to be operative without intervening stages of analog-to-digital or digital-to-analog conversion between said first digital channel emulator circuit and said test traffic generator circuit.

2. The communications test system of claim 1, further comprising a second digital channel emulator circuit adapted to accept said second set of digital baseband signals from said receive analog converter circuit and to introduce effects of transmission channel impairments into said second set of digital baseband signals, and further adapted to be operative without intervening stages of analog-to-digital or digital-to-analog conversion between said second digital channel emulator circuit and said test traffic analyzer circuit.

3. The communications test system of claim 2, wherein said second digital channel emulator circuit is adapted to emulate multipath impairments between the communications test system and the DUT.

4. The communications test system of claim 2, wherein said second digital channel emulator circuit is adapted to emulate noise impairments between the communications test system and the DUT.

5. The communications test system of claim 2, wherein said second digital channel emulator circuit is adapted to emulate a multiple-input multiple-output (MIMO) transmission channel between the communications test system and the DUT.

6. The communications test system of claim 1, wherein said first digital channel emulator circuit is adapted to emulate a multiple-input multiple-output (MIMO) transmission channel between the communications test system and the DUT.

7. The communications test system of claim 1, wherein said first digital channel emulator circuit is adapted to emulate multipath impairments between the communications test system and the DUT.

8. The communications test system of claim 1, wherein said first digital channel emulator circuit is adapted to emulate noise impairments between the communications test system and the DUT.

9. The communications test system of claim 1, wherein said first digital channel emulator circuit comprises a plurality of finite impulse response filters adapted to emulate a wireless multipath environment.

10. The communications test system of claim 9, wherein the finite impulse response filters comprise complex N-tap finite impulse response filters.

11. The communications test system of claim 9, wherein filter coefficients of the finite impulse response filters are adapted to be time-varying.

12. The communications test system of claim 11, wherein the filter coefficients are varied to emulate the wireless multipath environment for different transmission paths between the communications test system and the DUT.

13. The communications test system of claim 11, wherein the filter coefficients are dynamically reconfigured to emulate the wireless multipath environment for different transmission paths between the DUT and multiple clients being simulated by the communications test system.

14. The communications test system of claim 11, wherein the filter coefficients are varied to emulate the wireless multipath environment for different transmission paths between the communications test system and the DUT and to further provide motion simulation.

15. The communications test system of claim 13, wherein the filter coefficients are reconfigured on a packet by packet basis.

16. The communications test system of claim 15, wherein the filter coefficients are reconfigured to provide spatial motion simulation of multiple simulated clients moving independently.

17. The communications test system of claim 1, wherein the first digital channel emulator circuit is implemented as a digital signal processor.

18. The communications test system of claim 1, wherein the first digital channel emulator circuit is implemented as a digital signal processor using programmable logic.

19. A packet wireless communications test system comprising:
  test packet generator means for generating at least a first sequence of packets for transmission to a wireless device;
  test packet analyzer means for processing at least a second sequence of packets received from said wireless device;
  medium access control (MAC) means for imposing a medium access control protocol on said test packet generator means and said test packet analyzer means;
  digital baseband modulation means for converting said at least first sequence of packets to at least a first set of transmitted digital baseband signals;
  digital baseband demodulation means for converting at least a second set of received digital baseband signals to said at least second sequence of packets;
  at least a first digital channel conditioning means for conditioning said at least first set of transmitted digital baseband signals in a digital domain prior to analog conversion;
  radio frequency digital-to-analog and upconversion means for translating said at least first set of transmitted digital baseband signals to an analog radio frequency range for transmission to the wireless device under test; and
  radio frequency downconversion and analog-to-digital conversion means for translating said at least second set of received digital baseband signals from an analog radio frequency range, after being received from said wireless device under test, to said at least second set of received digital baseband signals;
  wherein said at least first digital channel conditioning means emulates wireless radio transmission channel effects between said packet wireless communications test system and said wireless device under test without analog-to-digital or digital-to-analog translations intervening between said digital baseband modulation means and said at least first digital channel conditioning means.

20. The packet wireless communications test system of claim 19, wherein said at least first digital channel conditioning means further conditions said at least first set of transmitted digital baseband signals to emulate a multiple-input multiple-output radio channel between the packet wireless communications test system and the wireless device under test.

21. The packet wireless communications test system of claim 19, wherein said wireless radio transmission channel effects comprise multipath and noise.

22. The packet wireless communications test system of claim 19, wherein the at least first digital channel conditioning means is further adapted to provide multi-client emulation.

23. The packet wireless communications test system of claim 19, wherein the at least first digital channel conditioning means is further adapted to provide motion simulation.

24. The packet wireless communications test system of claim 19, further comprising at least a second digital channel conditioning means for conditioning said at least second set of received digital baseband signals from said radio frequency downconversion and analog-to-digital conversion means, before they are provided to said digital baseband demodulation means, wherein said at least second digital channel conditioning means emulates wireless radio reception effects between said wireless device under test and said packet wireless communications test system without analog-to-digital or digital-to-analog translations intervening between said digital baseband demodulation means and said at least second digital channel conditioning means.

25. The packet wireless communications test system of claim 24, wherein said at least second digital channel conditioning means further conditions said at least second set of received digital baseband signals to emulate a multiple-input multiple-output radio channel between said wireless device under test and said packet wireless communications test system.

26. The packet wireless communications test system of claim 24, wherein said wireless radio reception effects comprise multipath and noise.

27. The packet wireless communications test system of claim 24, wherein said packet wireless communications test system comprises a wireless local area network device tester, wherein said wireless device under test comprises a wireless local area network device under test, and wherein said packet wireless communications test system is adapted to perform testing on said wireless local area network device under test via a cabled connection.

28. The packet wireless communications test system of claim 19, wherein said packet wireless communications test system comprises a wireless local area network device tester, wherein said wireless device under test comprises a wireless local area network device under test, and wherein said packet wireless communications test system is adapted to perform testing on said wireless local area network device under test via a cabled connection.

29. A method of testing a wireless device by a packet wireless communications test system, the method comprising:
  generating one or more transmitted packet streams for transmission to the wireless device under test, according to a medium access control protocol, in the form of a transmitted digital baseband signal;
  conditioning the transmitted digital baseband signal in a digital domain prior to any stages of analog upconversion or downconversion to provide a conditioned digital baseband signal to emulate effects of wireless transmission channel impairments;
  converting said conditioned digital baseband signal to a first radio frequency range signal; and
  transmitting said first radio frequency range signal to said wireless device under test.

30. The method of claim 29, wherein the conditioning further conditions the transmitted digital baseband signal to emulate a multiple-input multiple-output channel between the packet wireless communications test system and the wireless device under test.

31. The method of claim 29, wherein the wireless transmission channel impairments comprise multipath and noise, and wherein the conditioning further conditions the transmitted digital baseband signal to provide multi-client emulation and motion simulation.

32. The method of claim 29, wherein the conditioning uses filters having filter coefficients adapted to be time-varying to emulate a wireless multipath environment for different transmission paths between the packet wireless communications test system and the wireless device under test, and wherein the method further comprises varying the filter coefficients to provide multi-client emulation and motion simulation.

33. The method of claim 29, further comprising:
receiving a second radio frequency signal from said wireless device under test;
converting said second radio frequency signal to a received digital baseband signal;
conditioning said received digital baseband signal in the digital domain to provide a conditioned received digital baseband signal to emulate the effects of wireless reception channel impairments; and
processing said conditioned received digital baseband signal as received packet streams, according to a medium access control protocol.

* * * * *